United States Patent [19]

Koyanagi

[11] Patent Number: 5,209,264
[45] Date of Patent: May 11, 1993

[54] CHECK VALVE

[76] Inventor: Yoshihiro Koyanagi, c/o Kabushikikaisha Kashiharaseitai, 1-13-5, Taiheiji, Kashihara-shi, Osaka-fu, Japan

[21] Appl. No.: 907,642

[22] Filed: Jul. 2, 1992

[30] Foreign Application Priority Data

Jul. 5, 1991 [JP] Japan .................. 3-060652

[51] Int. Cl.⁵ .............................. F16K 15/16
[52] U.S. Cl. .................. 137/852; 137/844; 137/846
[58] Field of Search ............ 137/843, 844, 846, 852, 137/855

[56] References Cited

U.S. PATENT DOCUMENTS 4,708,167 11/1987 Koyanagi ............... 137/846 X
4,917,646 4/1990 Kieves ................. 137/846 X Primary Examiner—Robert G. Nilson
Attorney, Agent, or Firm—Larson and Taylor

[57] ABSTRACT

A check valve for bags containing goods such as rice or other grains or foods. The valve is used to discharge excessive air from the bag while preventing outside air from entering the bag. The check valve is constructed of plural plastic films joined together.

3 Claims, 4 Drawing Sheets

CHECK VALVE

BACKGROUND OF THE INVENTION

The present invention relates to a check valve as used for bags for containing therein goods which have to be stored under good conditions, for instance grains such as rice, and other foods or pulverulent or granular goods or materials liable to generate gases during storage in the bag, the check valve being used to discharge only fluid such as excessive air from the bag while preventing the outside air from entering into the bag. More particularly, the invention relates to an improvement of a check valve of a kind having a filter.

A check valve or fluid discharge tube of the kind having a filter is disclosed in Japanese Utility Model Application No. 12891/89 (Utility Model Application Laying Open No. 105877/90) and Japanese Utility Model Application No. 68350/89 (Utility Model Application Laying Open No. 8105/91) which were filed by the same applicant as this application. Such prior known check valve comprises a filter formed by a plastic nonwoven fabric folded over onto itself and mounted around a mouth portion formed in a base end portion of a flat fluid flow tube, and the interior of the base end portion of the flat fluid flow tube communicates with the exterior of said base end portion only through said filter.

This prior known check valve or fluid discharge tube is practically effective to discharge only gas or liquid from a bag to which the check valve or fluid discharge tube is mounted and to prevent outside air from entering into the bag. On the other hand, such check valve or fluid discharge tube has a problem that it is difficult to discharge the gas or liquid smoothly from the bag since the mouth portion of the flat fluid flow tube is extremely narrow so that the mouth portion of the fluid flow tube is sometimes closed and necessary discharge of the fluid can not always be effected.

SUMMARY OF THE INVENTION

The present invention was made to eliminate said problem of the prior known check valve or fluid discharge tube, and it is an object of the present invention to provide a check valve of the kind as above described which is able to and effectively and with certainty discharge only unnecessasry gas or liquid as existing or generated in the bag and which is able to reliably prevent the outside air from flowing backward into the bag.

In order to accomplish said object, the check valve according to the present invention comprises a first plastic film; a filtering second plastic film having fine holes, a third plastic film and a fourth plastic film which are shorter than said first plastic film respectively and arranged in this order on one surface of said first plastic film; the lower edges and the right and left side edges of said first and second plastic film being joined together to define a discharge path therebetween and a valve seat portion in the upper portion of said first plastic film; the lower edges of said third and fourth plastic films being joined to said second plastic film at its portion between its upper and lower edges and the right and left side edges of said third and fourth plastic films being joined to the right and left side edges of said second plastic film to define an upper opening between said first and fourth plastic film, a checking flap in the portion of said third plastic film as extended upwardly beyond the upper edge of said second plastic film for cooperation with said valve seat portion of said first plastic film, and a pocket between said third and fourth plastic films for pressing said checking flap against said valve seat portion, and the portion of said second plastic film in the lower side than the lower edges of said third and fourth plastic films being exposed for functioning as a filtering surface.

According to another feature of the present invention, said fourth plastic film is made longer than said third plastic film so that the upper portion of said fourth plastic film is extended upwardly beyond the upper edge of the third plastic film, and the third plastic film is thinner than the fourth plastic film.

According to a further feature of the present invention, a partial joining portion is provided in said upper opening to make narrow the fluid flow path.

The check valve according to the present invention is constructed as above described and it is inserted into e.g. a rice bag with said upper opening being projected outside the bag, and when the rice bag is pressed from outside, the air in the bag (residual air and breathing air of the rice grains) is effectively discharged through the fine holes in said substantially large filtering surface of said second plastic film into said discharge path and then smoothly discharged outside the bag through the upper opening. In this time, the rice grains are prevented from flowing outside the bag by the second plastic film.

When the pressure in the bag has decreased to a reduced pressure by the discharge of air, the outside air tends to flow backward into the bag through said upper opening. In this time, however, outside air flows into said pocket to press said checking flap against said valve seat portion to thereby close said discharge path and reliably prevents outside air from flowing into the bag.

DESCRIPTION OF THE PREFERRED EMBODIMENTS

Figure 1:
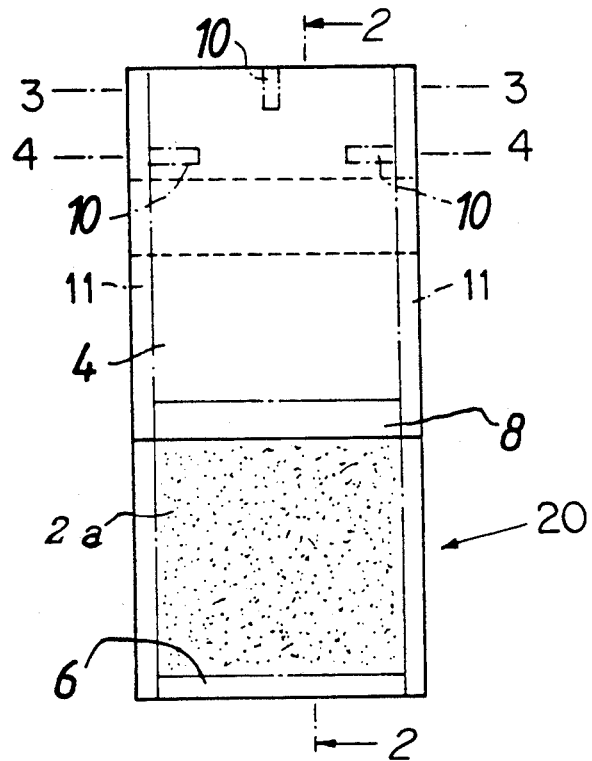
FIG. 1 is a front elevational view of an embodiment of a check valve according to the present invention.
Figure 2:
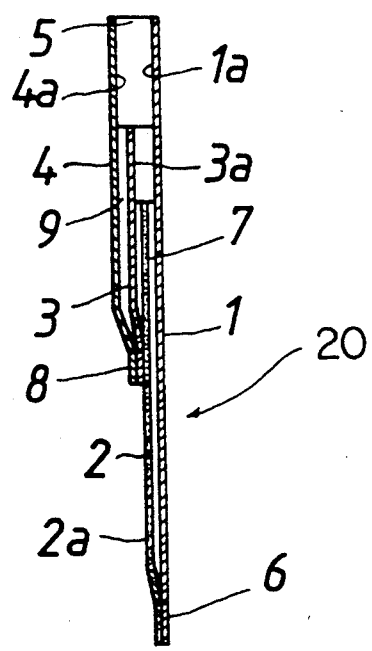
FIG. 2 is a sectional view taken along the line 2—2 of FIG. 1.
Figure 3:
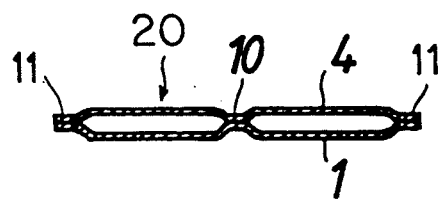
FIG. 3 is a sectional view taken along the line 3—3 of FIG. 1.
Figure 4:
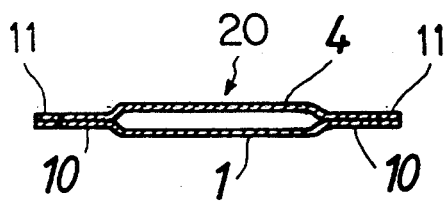
FIG. 4 is a sectional view taken along the line 4—4 of FIG. 1.
Figure 5:
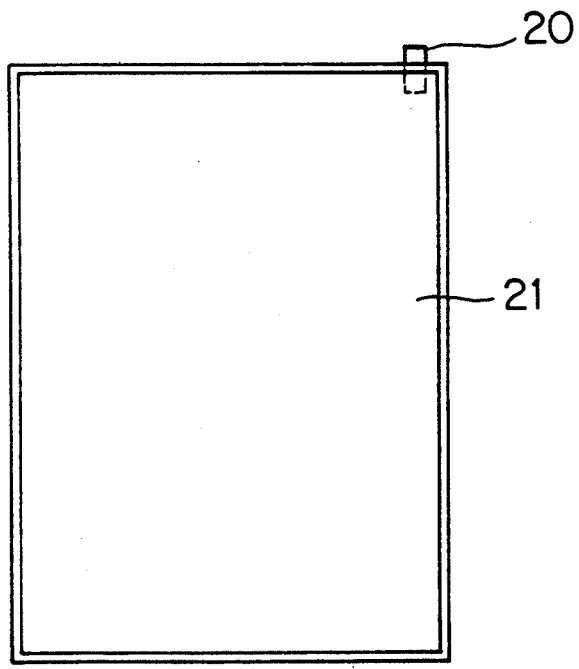
FIG. 5 is a schematical front elevational view showing the check valve mounted to a rice bag.

Referring now to the drawings, there is shown an embodiment of a check valve according to the present invention. The check valve 20 according to the present invention comprises a heat-bonding first plastic film 1 of longitudinally elongate rectangular shape, and a filtering second plastic film 2 of a heat-bonding non-woven plastic fabric having a number of fine holes. The second plastic film 2 has the same width as the first plastic film 1 but is a little shorter than the latter. The check valve 20 further comprises a heat-bonding thinner plastic film 3 having the same width as the first plastic film 1 but is substantially shorter than the latter, and a heat-bonding fourth plastic film 4 having the same width and thickness as the first plastic film 1 but is shorter than the first plastic film 1 and longer than the third plastic film 3.

Said second plastic film 2 is laid on said first plastic film 1 with the lower edges of these films being trued up or aligned each other. Said third and fourth plastic films 3 and 4 are laid on the second plastic film 2 with the lower edges of the films 3 and 4 being trued up each other and placed between the upper and lower edges of the film 2, typically about midway between these edges. The films 1, 2, 3 and 4 as superposed in this order form a lamination of four plastic films.

The right and left side edges of said film lamination are heat-bonded together to form seal portions 11, then the lower edges of the first and second plastic films 1 and 2 are heat-bonded together to form a seal portion 6, and then the lower edges of the third and fourth plastic films 3 and 4 are heated so as to heat-bond together the second, third and fourth plastic films 2, 3 and 4 other than the first plastic film 1 at the lower edges of the third and fourth plastic films 3 and 4 to form a seal portion 8.

In this way, due to the differences in the lengths of these plastic films 1, 2, 3 and 4 and due to the selection of the bonding or joining positions of these plastic films, there are formed an upper opening 5 between the first and fourth plastic films 1 and 4, a valve seat portion 1a in the upper portion of the first plastic film 1, a discharge path 7 for the fluid between the first and second plastic films 1 and 2, a checking flap 3a in the upper portion of the third plastic film 3 extending upwardly beyond the upper edge of the second plastic film 2 for cooperation with said valve seat portion 1a of the first plastic film 1, and a pocket 9 between the third and fourth plastic films 3 and 4 for pressing said checking flap 3a against said valve seat portion 1a into intimate contact with the valve seat portion 1a, and the upper portion 4a of the fourth plastic film 4 is extended upwardly beyond the upper edge of the third plastic film 3 and the portion of the second plastic film 2 in the lower side than the lower edges 8 of the third and fourth plastic films 3 and 4 is exposed for functioning as a filtering surface or portion 2a. In FIG. 1, the reference numeral 10 designates a partially heat-bonded portion in said upper opening 5 for making the fluid flow path narrow.

The check valve of the construction as described above is inserted into a suitable portion of a bag, e.g. a plastic rice bag 21 for discharging the air from the bag. The check valve is inserted into the rice bag with the upper opening 5 of the check valve being projected outside the rice bag. The interior and the exterior of the rice bag communicate with each other only through the fluid flow path of the check valve so that storing conditions for the rice are improved.

Figure 6:
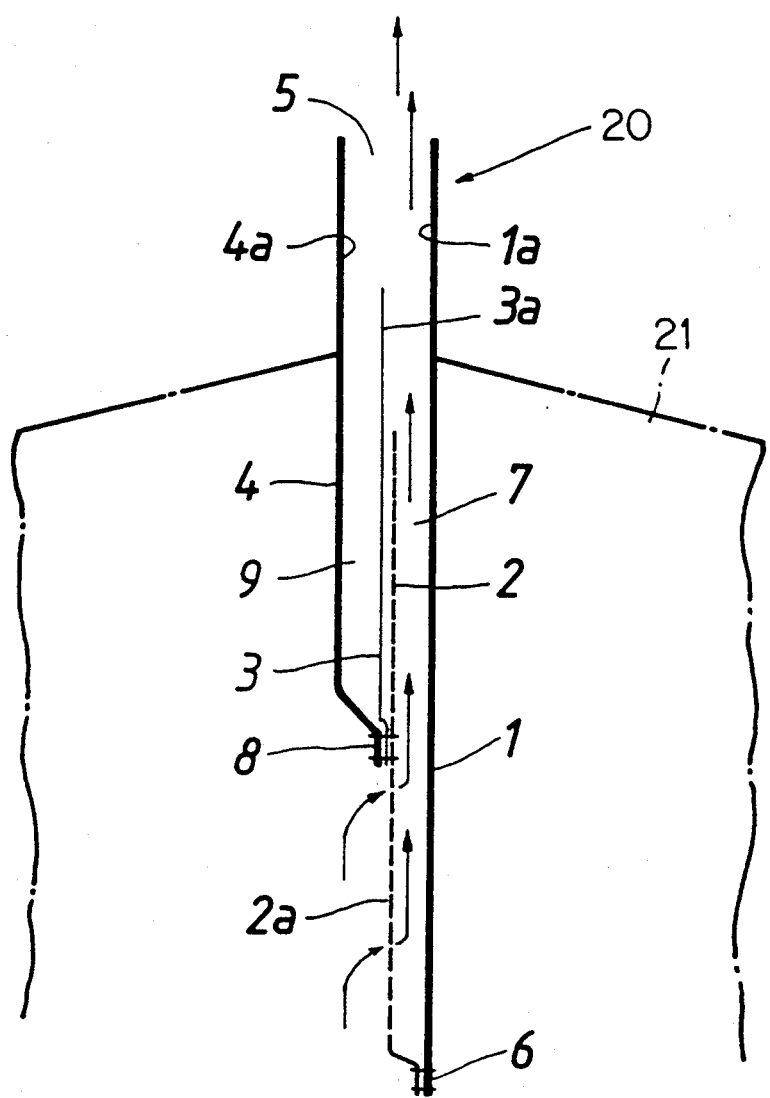
FIG. 6 is a schematical view of the check valve is operation to discharge the air.
Figure 7:
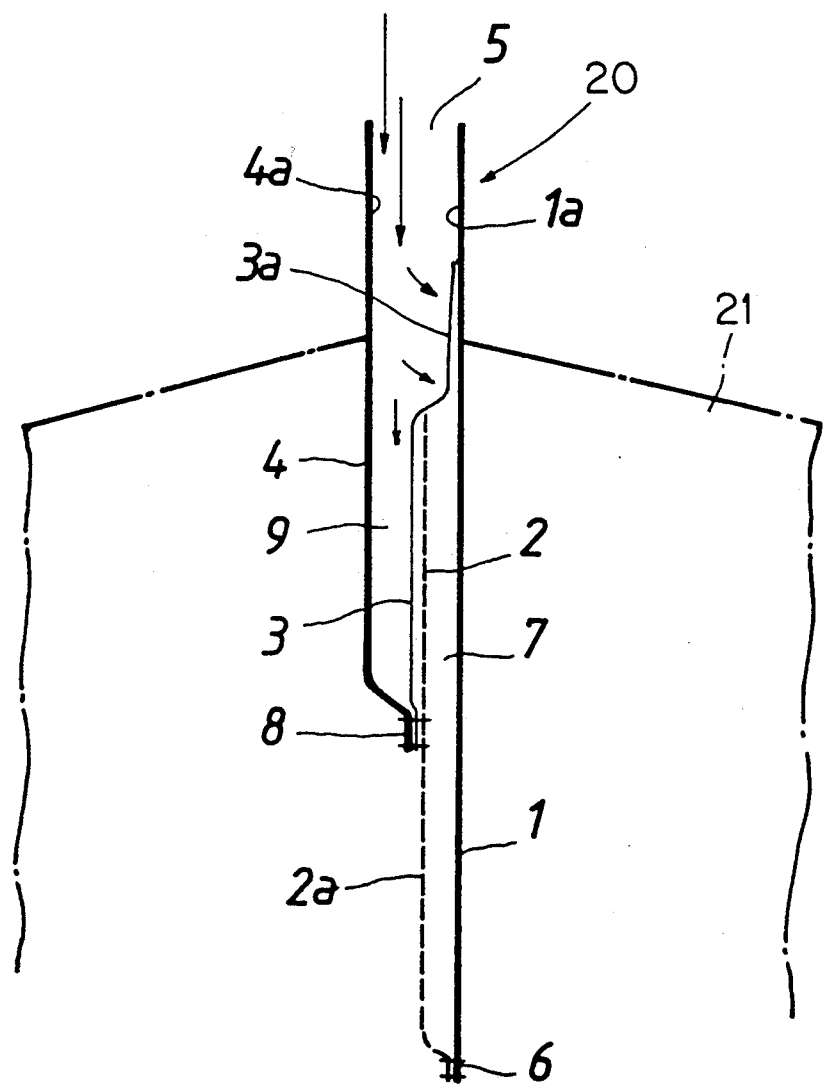
FIG. 7 is a schematical view of the check valve showing how it prevents outside air from flowing into the bag.

The function of the check valve will now be described with reference to FIGS. 6 and 7.

As described above, a substantial quantity of residual air exists in a rice bag in which the rice grains are contained and the rice grains generate air by breathing. By pressing the rice bag from the outside by inserting a sucking nozzle of a vacuum device (not shown in the drawings) into the discharge path 7 of the check valve through the upper opening 5 and sucking the air from the discharge path 7, the air existing in the bag is lead along with other unnecessary gases into the discharge path 7 through the filtering surface 2a of the filtering second plastic film 2 and then discharged outside the bag through the upper opening 5. Filtering surface 2a obstructs the flow or escape of rice grains out of the rice bag so that there is no fear of the rice grains being released from the bag. When a plurality of rice bags are stacked for storing, the air discharge is ceaselessly effected by being pressed by the weight of the bags.

When the pressure inside the rice bag P has decreased to a reduced pressure by the discharge of air, the outside air tends to flow backward into the rice bag through the upper opening 5 and discharge path 7. At the same time, however, the outside air certainly flows also in pocket 9 since the upper portion 4a of the fourth plastic film 4 extends upwardly beyond the upper edge of the third plastic film 3. The pressure of the air which flows into pocket 9 is exerted onto the checking flap 3a formed by thin plastic film 3 to intimately press the same against said value seat portion 1a as schematically shown in FIG. 7 to thereby close the outlet of the discharge path 7. In this way, the flow of the outside air backward into the rice bag is positively prevented so that reduced pressure is always maintained in the rice bag.

Furthermore, it is possible to secure a broad filtering surface 2a and it is also possible to make the filtering surface 2a broader or narrower. Therefore, the quantity of the air discharged from the rice bag per unit time may be most suitably adjusted.

The check valve according to the invention is constructed and functions as described above so that it brings that the following various advantages.

The interior and the exterior of a bag containing goods therein and to which a check valve according to the present invention is mounted communicate with each other only through a filtering plastic film so that by selecting the size of filtering holes in the filtering plastic film smaller than the size of the goods, only unnecessary gases or liquids will be discharged from the bag while the goods are maintained in the bag without being released.

In contrast to the prior check valve, the filtering function of the filtering plastic film is assured in the present invention by a substantially broad filtering surface, and the filtering surface is not clogged or blocked entirely by the goods contained in the bag so that discharge of fluid from the bag may be effected smoothly without any difficulty either when the bag is pressed from outside or the air in the bag is sucked out by using a vacuum device.

Furthermore, by the provision of the pocket for actuating the checking flap which cooperates with the valve seat portion in the discharge path, even when the outside air tends to flow backward into the bag the air which flows into said pocket quickly presses said checking flap intimately against said valve seat portion to thereby close the outlet of the discharge path so that there is no fear of the outside air flowing into the bag. Therefore, the goods in the bag are not affected by the outside air.

While the present invention has been described with reference to a preferred embodiment, it is to be distinctly understood that the invention is not limited thereto but may be modified without departing from the spirit of the invention. For instance, the filtering plastic film 2 may be formed by other material than the nonwoven plastic fabric and the check valve of the present invention may be used for storing in a sealed condition foods other than rice grains and gas generative materials other than foods. Furthermore, the fluid to be discharged from the bag may be not only air but also various gases or liquids as emitted by the goods contained in the bag.

What is claimed is:

1. A check valve comprising;
   a filtering second plastic film, a third plastic film and a fourth plastic film, said third and fourth plastic films being shorter than said first plastic film respectively and arranged in this order on one surface of said first plastic film;
   the lower edges and the right and left side edges of said first and second plastic films being joined together to define a discharge path therebetween and to define a valve seat portion in the upper portion of said first plastic film;
   the lower edges of said third and fourth plastic films being joined to said second plastic film at its portion between its upper and lower edges and the right and left side edges of said third and fourth plastic films and being joined to the right and left side edges of said second plastic film to define an upper opening between said first and fourth plastic films, to define a check flap in the portion of said third plastic film extending upwardly beyond the upper edge of said second plastic film for cooperation with said valve seat portion of said first plastic film, and to define a pocket between said third and fourth plastic films for pressing said checking flap against said valve seat portion, and
   the portion of said second plastic film in the side lower than the lower edges of said third and fourth plastic films being exposed for functioning as a filter surface.

2. A check valve as claimed in claim 1, wherein said fourth plastic film is made longer than said third plastic film so that the upper portion of the fourth plastic film extends upwardly beyond the upper edge of the third plastic film, the third plastic film being thinner than the fourth plastic film.

3. A check valve as claimed in claim 1, wherein a partial joining portion is provided in said upper opening to make the fluid flow path narrow.

* * * * *

UNITED STATES PATENT AND TRADEMARK OFFICE
CERTIFICATE OF CORRECTION

PATENT NO. : 5,209,264
DATED : May 11, 1993
INVENTOR(S) : KOYANAGI

It is certified that error appears in the above-identified patent and that said Letters Patent is hereby corrected as shown below:

Claim 1, between the first and second lines, insert --a first plastic film;--

Claim 1, last line, delete "filter" and insert --filtering--.

Signed and Sealed this

Eighth Day of March, 1994

Attest:

BRUCE LEHMAN

*Attesting Officer*  *Commissioner of Patents and Trademarks*